United States Patent
Yowler et al.

(10) Patent No.: US 10,353,272 B2
(45) Date of Patent: Jul. 16, 2019

(54) CLAMPING AND MOUNTING ACCESSORIES FOR MOTION PICTURE LIGHTING EQUIPMENT

(71) Applicants: Jay W. Yowler, Long Beach, CA (US); Richard Mall, Los Angeles, CA (US)

(72) Inventors: Jay W. Yowler, Long Beach, CA (US); Richard Mall, Los Angeles, CA (US)

( * ) Notice: Subject to any disclaimer, the term of this patent is extended or adjusted under 35 U.S.C. 154(b) by 0 days.

(21) Appl. No.: 15/293,279

(22) Filed: Oct. 14, 2016

(65) Prior Publication Data

US 2018/0107094 A1   Apr. 19, 2018

(51) Int. Cl.
| | |
|---|---|
| F16M 11/02 | (2006.01) |
| G03B 15/02 | (2006.01) |
| F16M 13/02 | (2006.01) |
| F16B 2/06 | (2006.01) |
| F16B 21/12 | (2006.01) |
| F16B 2/12 | (2006.01) |
| F21V 21/08 | (2006.01) |
| F21V 21/088 | (2006.01) |

(52) U.S. Cl.
CPC .............. *G03B 15/02* (2013.01); *F16B 2/065* (2013.01); *F16B 21/12* (2013.01); *F16M 13/022* (2013.01); *F16B 2/12* (2013.01); *F21V 21/08* (2013.01); *F21V 21/088* (2013.01)

(58) Field of Classification Search
CPC .............. F16M 11/14; F16C 11/06; A47F 1/11
See application file for complete search history.

(56) References Cited

U.S. PATENT DOCUMENTS

| | | | | |
|---|---|---|---|---|
| 7,740,220 B2 * | 6/2010 | Jeanveau | ............... | A45B 11/00 248/534 |
| 8,021,060 B2 * | 9/2011 | Sudhana | ............... | F16C 11/106 248/187.1 |
| 8,979,055 B2 * | 3/2015 | Chu | ........................ | F16M 11/14 248/177.1 |
| 2016/0279717 A1 * | 9/2016 | Batho | ................. | B23B 51/0473 |

* cited by examiner

*Primary Examiner* — Amy J. Sterling
(74) *Attorney, Agent, or Firm* — Lewis B. Sternfels (57) ABSTRACT

A support pin is engaged with a collar, as affixed to a mount, by an engaging mechanism between the support pin and the collar, which engaging mechanism provides interchangeability, index-ability and positive locking between the support pin and the collar. Motion picture lighting and rigging equipment is secured to the support pin. The engaging mechanism includes a V-shaped or other configured reception on or in the collar with a cross-pin or similarly other configured portion on the support pin (e.g., non-circular cross-sectional configurations such as a hexagon). A linchpin is placed though mating openings in the collar and support pin to lock the two together when the mating openings are aligned. Two or more crossing V-shaped receptions or non-circular cross-sectional configurations provide a variety of angular orientations of the support pin, especially for bent support pins, with respect to the collar.

10 Claims, 8 Drawing Sheets

CLAMPING AND MOUNTING ACCESSORIES FOR MOTION PICTURE LIGHTING EQUIPMENT

CROSS-REFERENCE TO RELATED APPLICATION

Not Applicable

REFERENCE REGARDING FEDERAL SPONSORSHIP OR DEVELOPMENT

Not Applicable

REFERENCE TO SEQUENCE LISTING OR MICROFICHE APPENDIX

Not Applicable

BACKGROUND OF THE INVENTION

1. Field of the Invention

The present invention relates to a mounting and clamping system for various equipment and, in particular, to improvements in motion picture lighting and grip equipment.

2. Description of Related Art and Other Considerations

There is a need to mount grip lighting equipment onto different objects and surfaces on and around film sets. Currently, there are several different products available. The industry standard uses either a ⅝" male support pin or a 1-⅛" female receiver. These products are generally permanently attached at one end to a plate (or, perhaps, a clamp or hanger), which is in turn attached to a support surface (or to an object capable of supporting the assembly). The other end of the support pin or receiver attaches a myriad of objects by clamping or by using a system of fasteners. Some of the products are called "Baby Plates"; these are available in many different lengths and styles, of which some are short, some are long, and there are also 45 degree and 90 degree pins. There are also receivers for accepting junior pinned items. These are called "Jr. Plates." Unfortunately, these prior art devices (as noted) are permanently attached to a base, thus lacking interchangeability. When different equipment is needed (perhaps a different kind of studio lamp, or the same lamp but at a different angle), the base must be unscrewed and removed, and a different plate/pin combination installed (causing delay and often damaging the surfaces to which it is attached). In addition to these types of plates, there are also "hangers" and clamps which use different types of jaws to enable attachments of equipment to different objects.

Currently, since the support pins are permanently attached to mounting devices (e.g., plates, hangers and clamps), there is the need to have many different kinds of pin/plate combinations and hangers available, depending on what kind of film equipment is needed, where it needs to be placed, and at what angle. The standard rigging package needs to have many redundant options available, resulting both in being costly and in taking up a large amount of space. If the wrong length pin is used or if there is a need to change the position of the equipment, one type of device would have to be detached from the wall or other supporting surface and replaced with another type of pin/plate combination hanger or clamp (in the use of a plate, it must be attached to the wall). Either longer or shorter pins or receiver or of a different shape or style thereof would be required. Repeated mounting and dismounting of plate/pin combinations can cause damage to the wall, etc.

SUMMARY OF THE INVENTION

These and other problems are successfully addressed and overcome by the present invention. The system as advanced in the present invention uses the basis of all the different products available and has the ability to change the support pin or receiver type regardless of how it is mounted or clamped to an object. An indexable standardized female receiver "Collar" provides for the attachment of all of the current devices that would enable the acceptance of many different types of support pins and Jr. receivers which are currently offered. An insertable "Two Action Safety Pin" (a linchpin as distinguished from a bendable cotter pin, e.g.), which linchpin comprises a locking mechanism such as a two-stage aircraft pin, is employed once the support pin (that is, a ⅝" male support pin or a 1-⅛" female receiver as distinguished from a linchpin) is chosen to make the attachment point secure and not to allow accidental removal. A baby support pin could be quickly changed to a Jr. Receiver or from a short support pin to a long support pin or a 90 degree support pin. The options are endless. It would be unnecessary to have on hand all the different types of single use clamps and plates currently available.

Several advantages are derived from this arrangement. Of particular importance, the present invention affords interchangeability, index-ability and positive locking between a support pin and a collar as secured to a mount. Collars of various lengths, especially smaller lengths, are employable. Attachments of such motion picture lighting and rigging equipment are facilitated without the need for repeated accessory changes and the need for different kinds of plates and hangers. The dependency, on what and where the piece of film equipment needs to be placed, is avoided. The redundant option for standard rigging package needs is avoided and the costs therefor, including the taking up a large amount of space, is likewise avoided. Additional circumvention of using the wrong length support pin or the need to change the position of the equipment is afforded.

Other aims and advantages, as well as a more complete understanding of the present invention, will appear from the following explanation of exemplary embodiments and the accompanying drawings thereof.

DETAILED DESCRIPTION OF THE PREFERRED EMBODIMENTS

Figure 1:
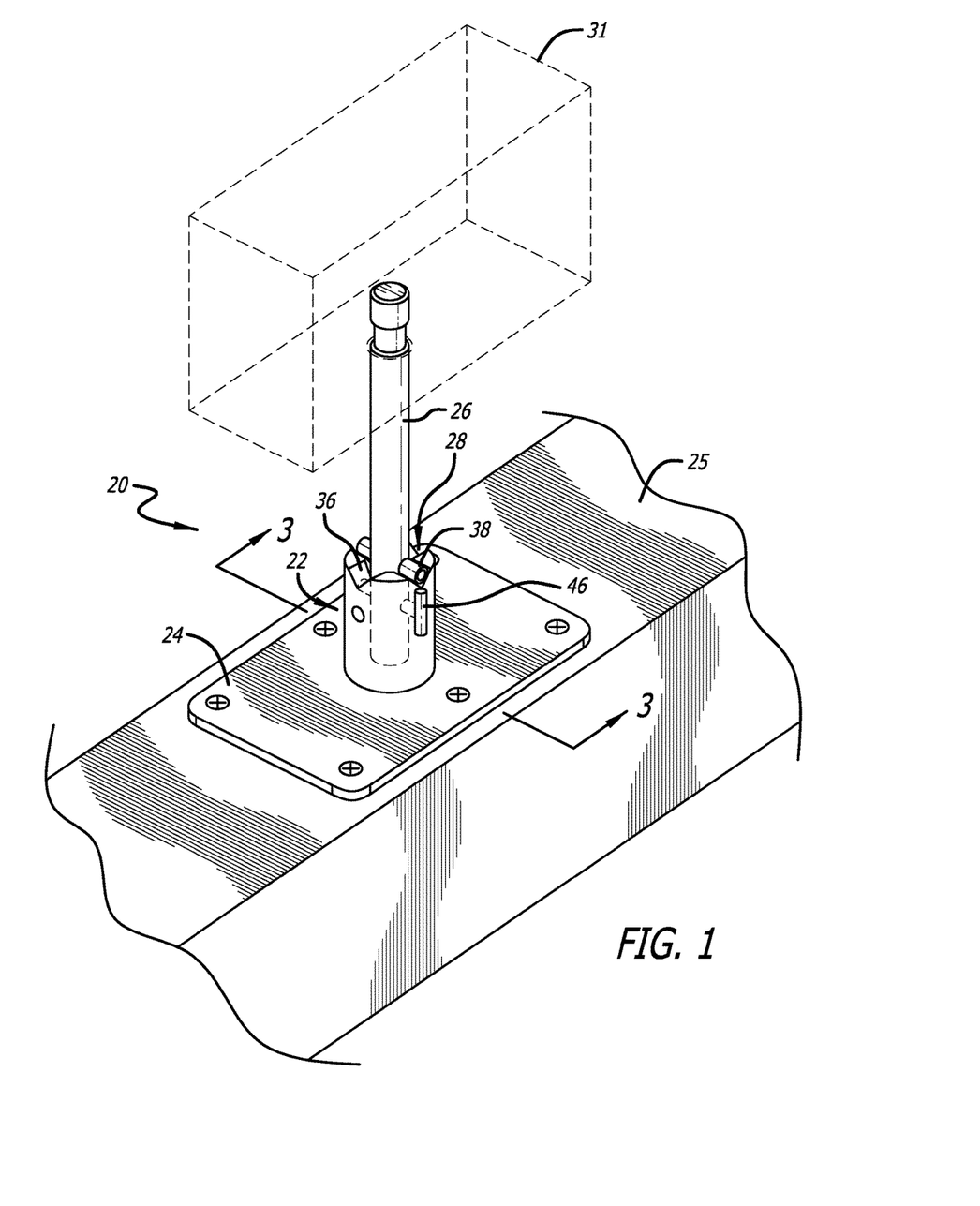
FIG. 1 is an isometric illustration of a preferred embodiment of the present invention comprising a clamping mount accessory utilizing a straight support pin engaged with a collar, which collar is affixed to a mount formed as a plate (sometimes referred to in the trade as a "Baby Plate"). The support pin to collar engagement employs a crossing groove arrangement in the collar.
Figure 2:
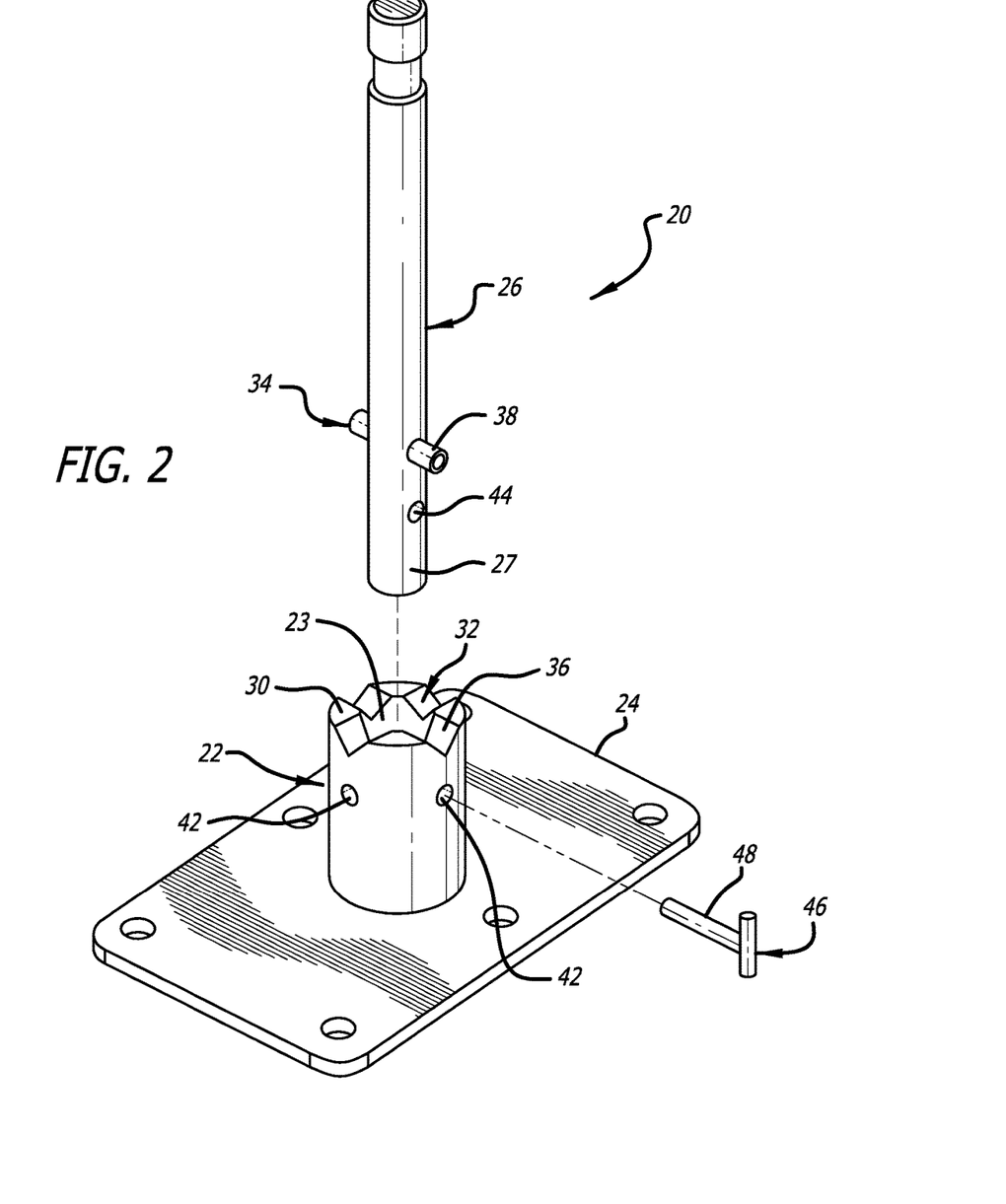
FIG. 2 is an isometric and exploded illustration of the embodiment depicted in FIG. 1 but with the support pin separated from the collar prior to their being engaged.
Figure 3:
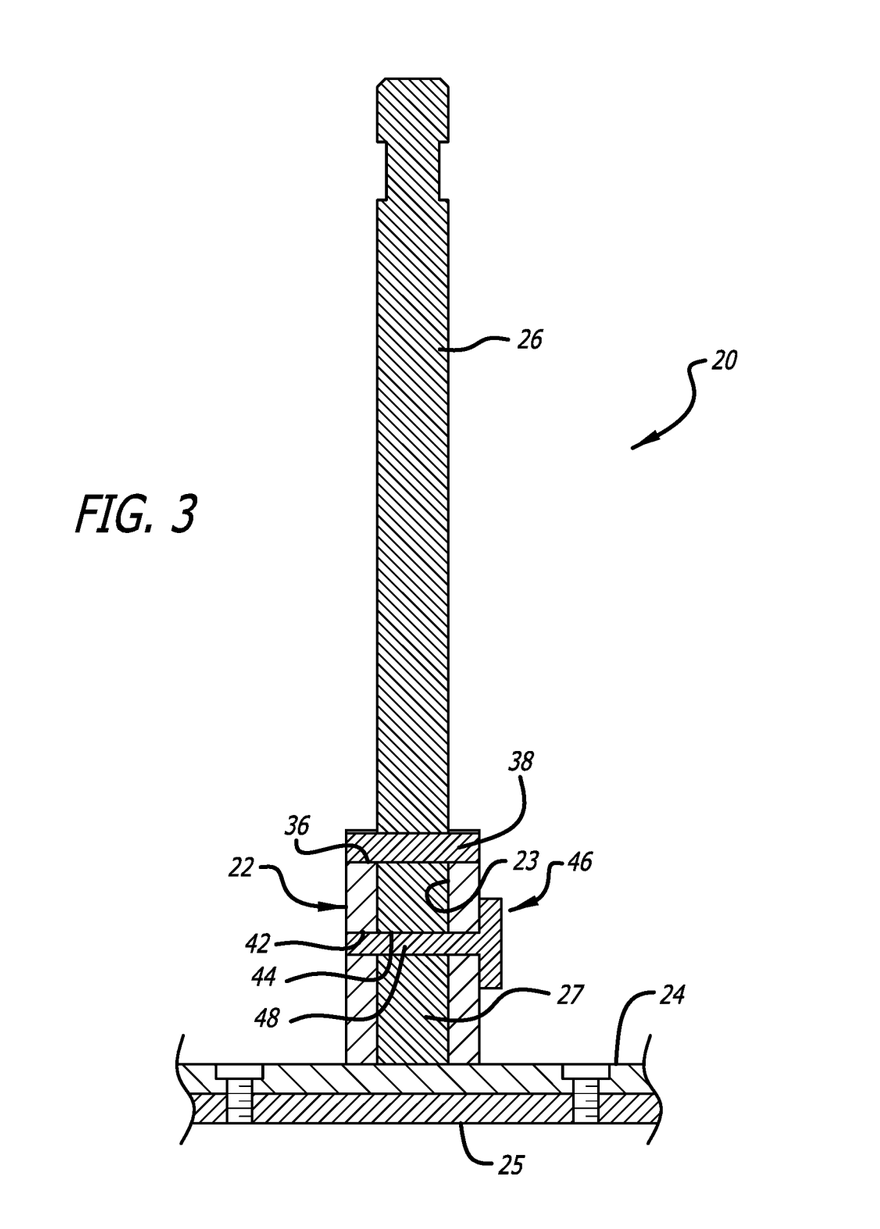
FIG. 3 is a cross-sectional view of the embodiment shown in FIG. 1 taken along line 3-3 thereof.

Accordingly, as depicted in FIGS. 1-3, a clamping mount accessory 20 includes a collar 22 which is affixed to a mount specifically formed as a plate 24, sometimes referred to in the trade as a "Baby Plate." The mount is affixed to a support 25, which may take the form of a platform, beam, wall, rod, etc., that is, a support upon which any piece of film equipment, for example, needs to be placed. The collar includes an inner tubular receptor or pin-receiving portion 23. A support pin 26, here a straight support pin, has a rounded end portion 27, which is configured for insertion within inner tubular receptor 23. The support pin is further adapted to be fitted to collar 22 by an engagement mechanism, to be described in the following paragraphs as being differently configured. The engagement mechanism includes engagement features respectively on the collar and on the support pin that provides the support pin with a desired angular orientation with respect to the collar and, therefore, a desired or needed positioning of such motion picture lighting and rigging equipment. Collar 22 terminates with an end 30 opposite from where the collar is affixed to plate 24.

As shown in FIG. 1, support pin 26 is coupled in any convenient manner to any form of desired equipment 31, e.g., film equipment, specifically motion picture lighting and rigging equipment.

Figure 4:
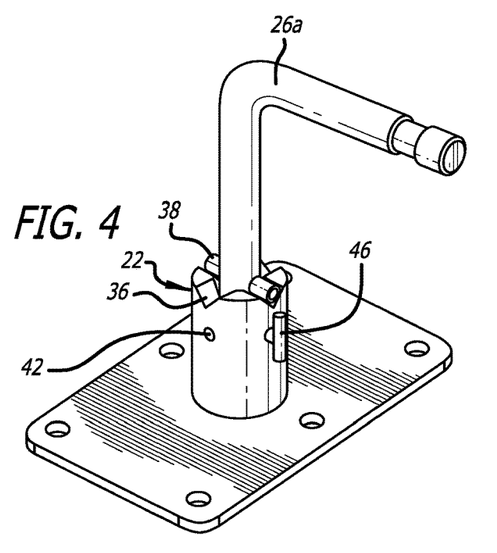
FIG. 4 is an isometric illustration of the embodiment shown in FIG. 1 but utilizing a 90 degree support pin as being representative of fellow support pins having differently oriented bends.

The engagement mechanism may take any one of several configurations, a preferred one being illustrated in FIGS. 1-8 and, as best seen in FIG. 2, as a collar engagement element 32 and a pin engagement element 34. Collar engagement element 32 is shaped as a female coupler or receptacle. Pin engagement element 34 is configured as a male coupler shaped to mate with collar engagement element 32. More specifically, collar engagement element 32 comprises an orthogonally crossing V-shaped configuration 36, herein shown as indentations formed in collar end 30, and the male coupler element specifically comprises a component 38 shaped as a cross-pin which is adapted to engage with and be seated within one of the crossing receptacle V-shaped configuration/indentations (indicium 36). While such a V-shaped configuration/indentation is illustrated as two with an orthogonally crossing configuration, other angular crossings are employable so as to enable the support pin to be rotated to numerous stops, which is particularly useful when the support pin is bent as depicted in FIG. 4. In addition, other indentations other than a V-shaped configuration may be employed, such as a U-shaped or square indentation. Such indentations, regardless of their configurations, comprise one form of a shaped indexing feature. V-shaped configuration 36 and component 38 shaped as a cross-pin comprise one form of engagement feature important in the practice of the present invention, here two different rotational engagement features. Such different rotational features provide for a 90 degree indexing between pin 26 and collar 22. Accordingly, when additional rotational engagement or indexing features are desired, additional indentations can be employed to provide additional rotational positions, e.g., four and six pairs of uniformly spaced indentations enable respective 45 degree and 30 degree rotational positioning between the pin and the collar.

To ensure that support pin 26 remains secure within collar 22, both the collar and the support pin are provided with respective through pinning openings 42 and 44. Opening 44 is parallely oriented with component 38 of pin engagement element 34. With respect to collar opening 42, there as many such through openings in collar 22 as there are V-shaped configuration/indentations (indicium 36) in the collar, and each of openings 42 is parallely oriented with respect to its mated or paired V-shaped indentation. A linchpin 46 with an insertable element 48 is adapted to secure the collar and the support pin together when pinning openings 42 and 44 are aligned and linchpin element 48 is inserted through the openings. The linchpin may take the configuration as depicted or as a conventional locking mechanism such as a two-stage aircraft pin, a positive locking pin (also known as a push button pin or a ball lock pin), a plunger pin, a lynch pin and a wire lock pin. Added to these pins may be a wire rope lanyard assembly to attach a quick-release pin and a detent pin to a fixture or frame so as to prevent the pin from being misplaced while not in use.

Figure 5:
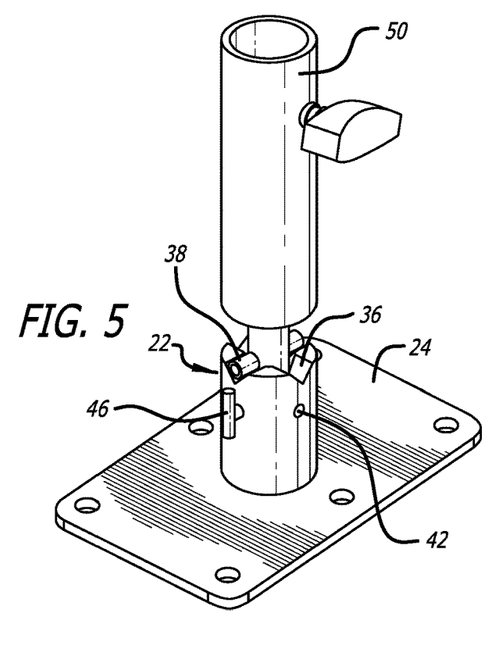
FIG. 5 is an isometric illustration of the embodiment shown in FIG. 1 but utilizing a receiver for accepting a junior pinned item.

While the present invention embodies the employment of a straight support pin 26 such as shown in FIGS. 1-3, other configurations are as adaptable as illustrated in FIGS. 4 and 5, including a 90 degree angled support pin 26a and a receiver 50 (sometimes referred in the trade as a "JR. Receiver") mounted on a straight support pin, such as support pin 26. Both the FIGS. 4 and 5 configurations are receivable in collar 22. Angled support pin 26a is shown as representative of other support pins which are angled differently from 90 degrees, that is, as having differently oriented bends. Therefore, with the employment of other angular V-indentation crossings, differently bent support pins can be rotated with their needed orientation with respect to specific motion picture lighting and rigging equipment, and the corresponding opening (opening 42) is properly aligned with opening 44 in support pin 26 for enabling insertable element 48 of the linchpin to affix the engagement of the support pin with the collar.

Figure 6:
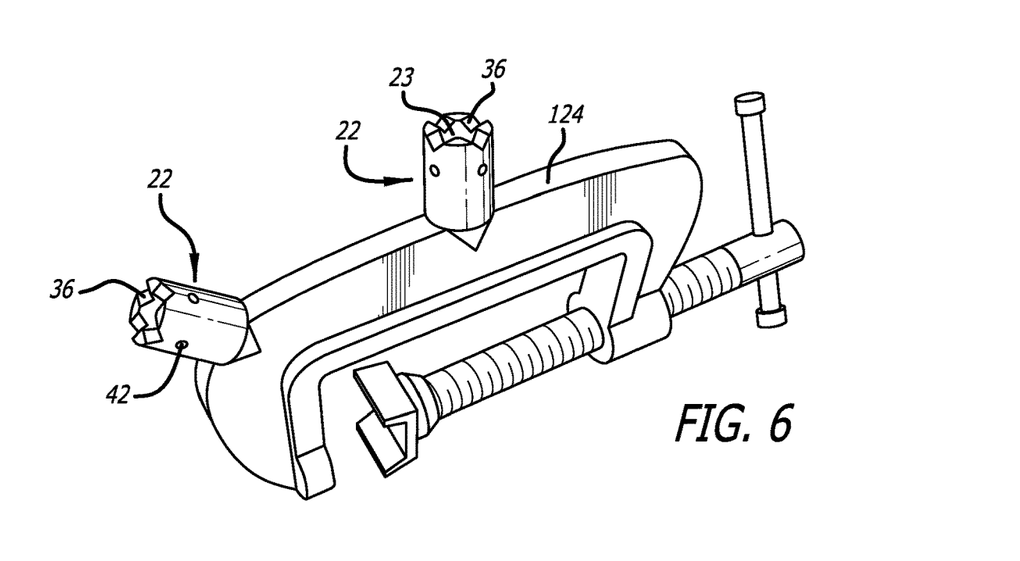
FIG. 6 is an isometric illustration of the embodiment shown in FIG. 1 in which the collars thereof are on a mount formed as a C-clamp.
Figure 7:
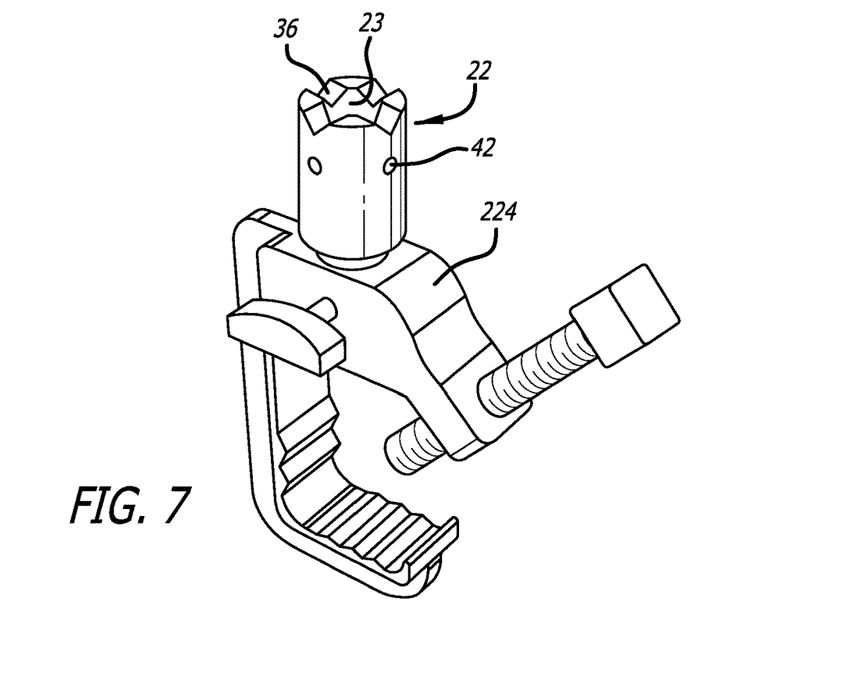
FIG. 7 is an isometric illustration of the embodiment shown in FIG. 1 in which the collar thereof is on a mount formed as a pipe hanger.
Figure 8:
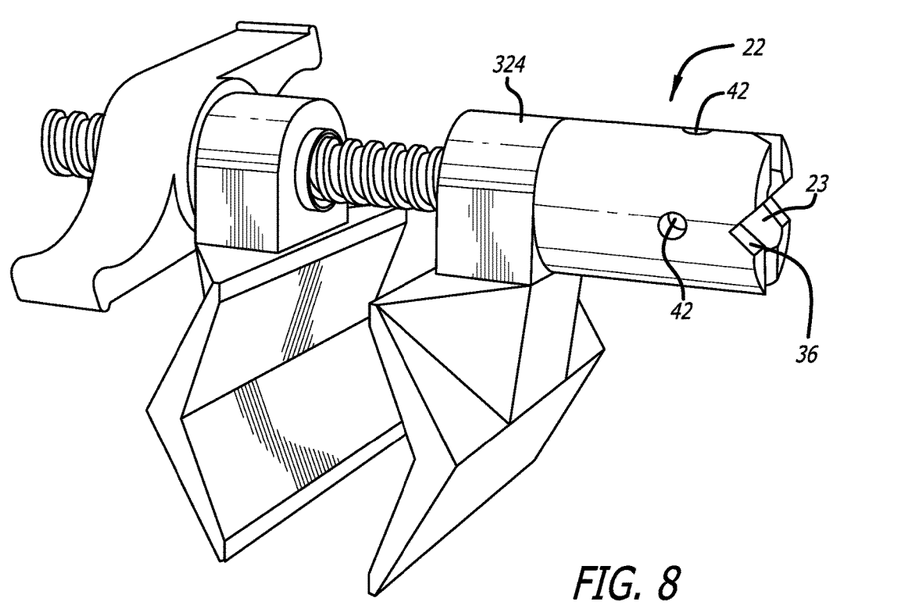
FIG. 8 is an isometric illustration of the embodiment shown in FIG. 1 in which the collar thereof is on a mount formed as a "Cardellini" as described and shown in U.S. Pat. No. 5,276,949.

FIGS. 6 through 8 are representative of other supports for one or more collars 22 such as a C-clamp 124 and a pipe hanger 224. In other words, in lieu of attaching collar 22 to plate 24 (which in turn is mounted to a support surface), collar 22 is mounted to some other attachment mechanism, such as C-clamp 124, pipe hanger 224, "Cardellini" 324 (as described and shown in U.S. Pat. No. 5,276,949), or any other collar attachments, including those selectively made to a vise grip, a chain vise grip, and a breadboard holder. A broad set of devices to which the collars of the present invention may be attached are offered by Matthews Studio Equipment, Inc., 4520 W. Valerio Street, Burbank, Calif. 91505.

Figure 9:
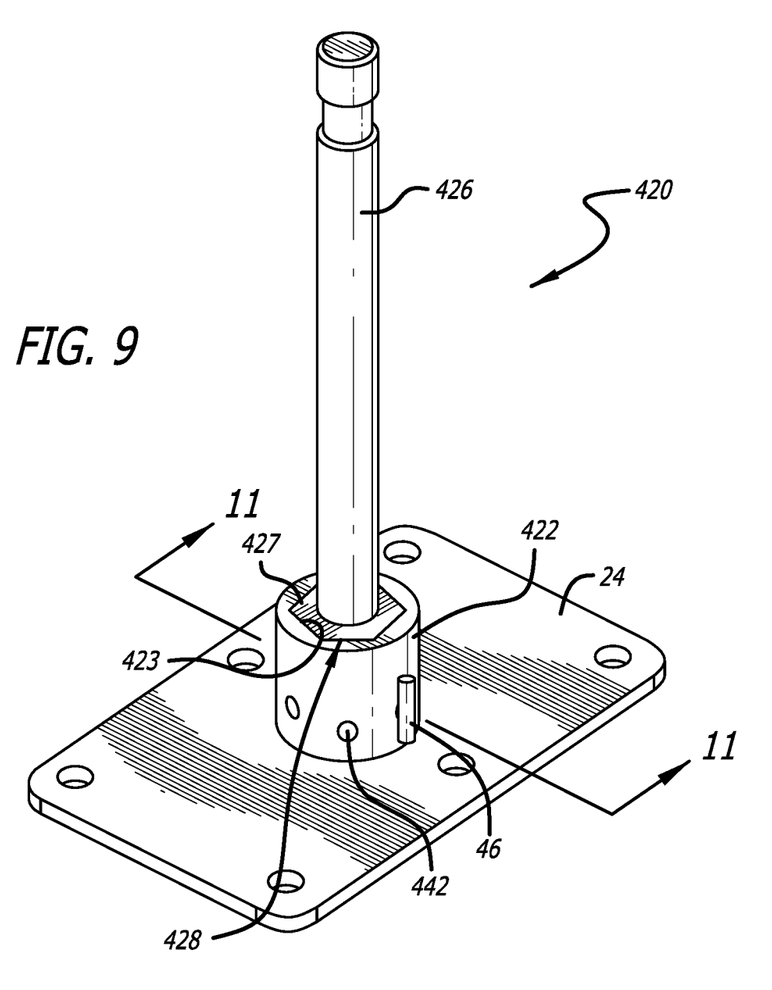
FIG. 9 is an isometric illustration of an alternate embodiment of the present invention comprising a clamping mount accessory utilizing a straight support pin engaged with a collar, in which the engagement therebetween employs a hexagonal engagement. In a like manner as previously illustrated, the collar is secured to a mount formed as a plate.
Figures 10, 11:
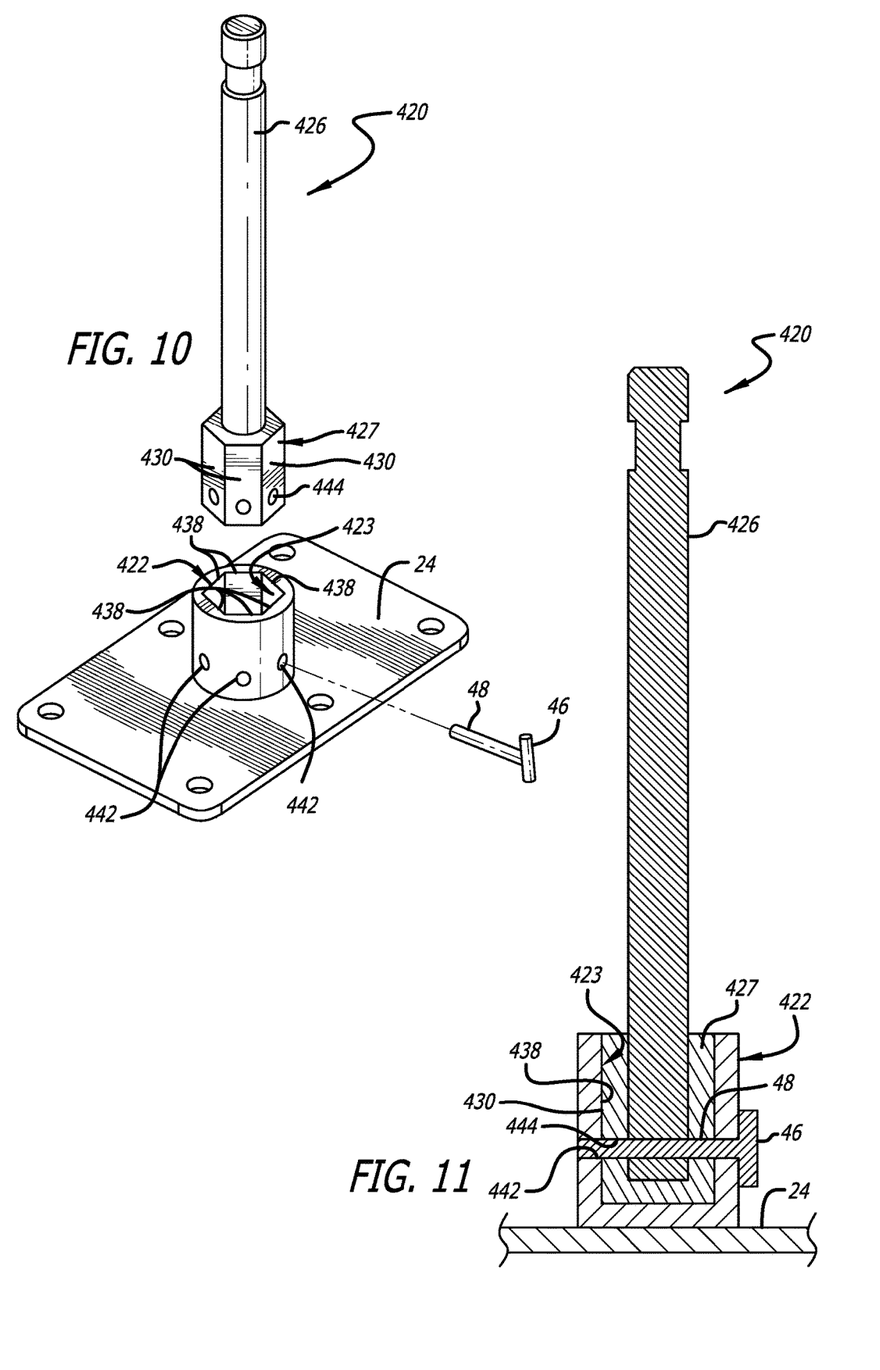
FIG. 10 is an isometric and exploded illustration of the embodiment depicted in FIG. 8 but with the support pin separated from the collar prior to their being engaged.
FIG. 11 is a cross-sectional view of the embodiment shown in FIG. 8 taken along line 11-11 thereof.

Referring now to FIGS. 9-11, an alternative clamping mount accessory 420 is illustrated. Clamping mount accessory 420 includes a collar 422 which is affixed to a mount specifically formed as a plate 24, as similarly depicted in FIGS. 1-5 or alternatively as illustrated in FIGS. 6-8. The collar includes an inner tubular receptor or pin-receiving portion 423. A support pin 426 having a hexagonally-shaped end portion 427 is adapted to be inserted within inner tubular receptor 423 and is secured to collar 422. The hexagonally shaped coupling between support pin 426 and collar 422 forms an engagement mechanism 428 which is comparable to that described and illustrated with respect to the FIG. 1-3 cross-pin and V-shaped indentation mechanism. Support pin 426 may be coupled in any convenient manner to any form of desired equipment. Accordingly, this hexagonal engagement configuration performs a similar function as the engagement of cross-pin component 38 with V-shaped configuration 36 and, if other than a hexagonal coupling, offers alternative rotational opportunities for bent or straight support pins, here several different rotational engagement features. Such different rotational features provide for a 90 degree indexing feature between pin 26 and collar 22.

Accordingly, the engagement mechanism in FIGS. 9-11 comprises inner tubular receptor (alternatively termed collar engagement element) 423 and hexagonally-shaped end portion (pin engagement element) 427. Collar engagement element 423 is shaped as a female coupler or receptacle. Pin engagement element 427 is configured as a male coupler configured to mate with collar engagement element 423.

To ensure that support pin 426 remains secure within collar 422, both the collar and the support pin are provided with respective through pinning openings 442 and 444, similarly as previously shown. In this embodiment, however, both collar inner hexagonal receptor or pin-receiving portion 423 and support pin end portion 427 are provided with their parallely oriented openings. Specifically, receptor 423 includes parallely facing internal faces 438 (in this illustration three paired facing faces in a hexagonally configured receptor) with pinning openings 442 extending through each of the paired faces. In a like manner, hexagonal end portion 427 of support pin 426 terminates with external faces 430, numbering six for a hexagonally configured end portion. Parallely oriented faces 430 form three paired faces through which three openings 444 extend. For other configured embodiments having a non-circular cross-section, for example, an octagonally configured pin-receiving portion and a octagonally configured support pin end, there would be four internal and external paired faces with their respective four openings therethrough (almost any number of sides can be used).

In addition, when additional rotational engagement or indexing features are desired in a circular cross-section, additional longitudinally extending grooves (as existing between adjacent faces 438) can be employed to provide additional rotational positions, e.g., a plurality of longitudinally extending grooves extending 360 degrees within pin-receiving portion 423 of collar 422. All such rotational engagement or indexing features, regardless of their configurations, comprise another form of a shaped indexing feature.

A linchpin 46 with an insertable element 48 is adapted to secure the collar and the support pin together when pinning openings 442 and 444 are aligned and linchpin element 48 is inserted through the openings. The linchpin may take the configuration as depicted and described before, along with their described alternates. The hexagonal configuration of collar 422 and support pin end portion 427 comprise another form of engagement feature important in the practice of the present invention.

Although the invention has been described with respect to particular embodiments thereof, it should be realized that various changes and modifications may be made therein without departing from the spirit and scope of the invention.

What is claimed is:

1. A clamping mount accessory comprising:
a collar affixed to a mount;
a support pin;
a mechanism effecting a fixed engagement between said support pin and said collar which mechanism prevents rotation therebetween;
in which said engagement mechanism comprises mutually engageable collar and engagement elements associated with said collar and said support pin;
in which said engagement elements comprise male and female couplers respectively associated with said support pin and said collar;
in which said female coupler includes a receptacle having an shaped configuration and said male coupler comprises an element configured to mate with said receptacle shaped configuration;
in which said receptacle shaped configuration comprises a shaped indexing feature and said male coupler element comprises a component adapted to engage with said shaped indexing feature;
wherein said collar has an end facing said component of said support pin and said receptacle-shaped indexing feature is placed in said collar end;
wherein said shaped indexing feature comprises at least one indentation formed in said collar end; and
wherein
said collar has a tubular inner surface;
said indentation comprises a pair of V-shaped indentations in said collar end; and
said support pin has both an end insertable within said tubular inner surface and a cross-pin adapted to fit into said pair of V-shaped indentations.

2. The clamping mount accessory according to claim 1 wherein said pin comprises a bent pin, and further comprising at least one additional pair of V-shaped indentations positioned within said end angularly placed from said first-mentioned pair of V-shaped indentations for providing an rotational indexing of said pin with respect to said collar.

3. The clamping mount accessory according to claim 1 in which said receptacle male coupler-engaging opening comprises a non-circular shaped opening and said male coupler component comprises a non-circular shaped end matable and fittable within said non-circular shaped opening.

4. The clamping mount accessory according to claim 1 in which said receptacle opening comprises a hexagonally-shaped opening and said male coupler component comprises a hexagonally-shaped end fittable within said hexagonally-shaped opening.

5. A clamping mount accessory comprising:
a collar affixed to a mount;
a support pin;
a mechanism effecting a fixed engagement between said support pin and said collar which mechanism prevents rotation therebetween;
including pinning openings respectively in said collar and in said support pin and a linchpin adapted to be inserted within the pinning openings, whereby said support pin is affixed in its engagement with said collar when (a) said collar and said support pin are engaged, (b) the openings are aligned and (c) said linchpin is inserted into said pinning openings;

including an engagement mechanism between said collar and said support pin for providing an angular orientation of said support pin with respect to said collar, said engagement mechanism comprising mating collar and support pin features that enable the angular orientation and whereby (a) said respective openings in said collar and in said support pin are enabled to be oriented with respect to said mating collar and support pin features and (b) said linchpin, as inserted into said pinning openings, secures the angular orientation;

wherein (a) said mating collar and support pin features comprise crossing V-indentations in said collar and a cross-pin in said support pin and (b) said pinning openings are parallely oriented respectively with said crossing V-indentations and said support pin cross-pin.

6. The clamping mount accessory according to claim 5 wherein (a) said mating collar and support pin features comprise a configuration of non-circular cross-section within said collar and a correspondingly shaped non-circular configuration on said support pin and (b) said pinning openings are parallely oriented respectively with said respective collar and support pin non-circular configurations.

7. The clamping mount accessory according to claim 6 wherein said respective collar and support pin non-circular configurations comprise hexagonal configurations.

8. A clamping mount accessory comprising:
a support pin having an end;
a collar affixed to a mount, said collar having an end facing said support pin and a receptacle for receiving said support pin end; and
an engagement mechanism effecting a fixed engagement between said support pin and said collar which mechanism prevents rotation therebetween, said engagement mechanism comprising a V-shaped configuration set in said collar end and a cross-pin extending through said support pin end whereby, when said support pin end is received in said collar receptacle, said support pin cross-pin is non-rotatively seated in said V-shaped configuration to fixedly couple said support pin to said collar.

9. The clamping mount accessory according to claim 8 further comprising pinning openings respectively in said collar and in said support pin and respectively parallely oriented with said V-shaped configuration and said cross-pin, and a linchpin adapted to be inserted within said V-shaped configuration and cross-pin pinning openings and when said V-shaped configuration and cross-pin pinning openings are oriented with one another, to affix said support pin to said collar.

10. The clamping mount accessory according to claim 8 wherein said support pin comprises a bent support pin and said engagement mechanism includes at least two different rotational engagement features between said collar and said bent support pin so as to enable said bent support pin to be differently rotated with respect to said collar.

* * * * *